United States Patent Office 3,451,908
Patented June 24, 1969

---

3,451,908
METHOD FOR PREPARING POLYOXYPERFLUOROMETHYLENIC COMPOUNDS
Dario Sianesi, Giancarlo Bernardi, and Giovanni Moggi, Milan, Italy, assignors to Montecatini Edison S.p.A., Milan, Italy, a corporation of Italy
No Drawing. Filed July 13, 1967, Ser. No. 653,012
Claims priority, application Italy, July 19, 1966, 16,704/66
Int. Cl. C07c 51/38, 53/14
U.S. Cl. 204—158  6 Claims

ABSTRACT OF THE DISCLOSURE

Process of preparing linear polyethers with a —COF terminal group. Involves reacting perfluoropropylene with oxygen in gaseous phase in the presence of ozone.

---

BACKGROUND OF THE INVENTION

Field of the invention

The present invention relates to a new process for the preparation of polyoxyperfluoromethylenic compounds consisting of carbon, fluorine and oxygen.

Description of the prior art

The products obtained by the process of the present invention have the structure of linear polyethers, with a —COF terminal group. These products are represented by one of the two following general formulae:

(A)  $CF_3O—(CF_2O)_n—COF$
(B)  $CF_3O—(CF_2O)_n—CF_2—COF$ in which $n$ is zero or a whole number from 1 to 100.

These products have been described in our Italian Patent 773,214 and in our U.S. patent application entitled "Polyoxyperfluoromethylene Compounds and Process of Their Preparation," Ser. No. 652,000, filed July 10, 1967.

Said patent applications describe the preparation of these products by reacting perfluoropropylene and molecular oxygen with each other in the gaseous phase, at temperatures of from 300° to 1000° C., preferably from 350° to 700° C.

SUMMARY OF THE INVENTION

It has now been found that the same reactants will form the products of the two aforementioned classes (A) and (B) by carrying out the reaction in the presence of another component which serves as a reaction initiator. It has been found that ozone is particularly effective as the initiator, either separately prepared and then introduced into the reaction zone or else prepared in situ according to known methods.

DESCRIPTION OF THE PREFERRED EMBODIMENTS

The present invention relates to a process for the preparation of polyoxyperfluoromethylenic compounds of the general formula:

$CF_3—O—(CF_2O)_n—COF$ and/or $CF_3—O—(CF_nO)_n—CF_2—COF$ in which $n$ is zero or a whole number from 1 to 100, comprising reacting perfluoropropylene and molecular oxygen in the gaseous phase in molar ratios of from about 2:1 to 1:10, and preferably from about 1:1 to 1:3, under a total pressure of from about 0.05 to 10 atmospheres and preferably from about 0.1 to 2 atmospheres at temperatures of from about —50° to 350° C., and preferably from about —30° to +300° C., in the presence of ozone. The oxygen may be prepared in situ by irradiation of the reaction system with electromagnetic radiations having a wave length lower than 3300 A. Alternatively, the ozone may be introduced into the system in an amount of from about 0.01 to 10 mols of ozone, and preferably 0.1 to 5 mols of ozone, per 100 mols of oxygen.

The useful electromagnetic radiations comprise both X radiations or γ radiations and ultraviolet radiations with a wavelength lower than 3300 A.

The process of the present invention, as compared to that described in the aforementioned patent applications, shows the marked advantage of enabling the obtaining of higher conversions to products having higher molecular weights. Moreover it permits one to operate at or near room temperature with a considerable simplification of the apparatus required for the process. If one prefers to operate at higher temperatures, even as high as 250–350° C., one may utilize the heat evolved from the exothermic reaction without the need to utilize external heat sources.

The process of this invention can be carried out via a batch method, namely, by reacting in a reactor a mixture of oxygen and perfluoropropylene under temperature and pressure conditions as defined above and supplying into the system the reaction initiator, prepared apart or in situ.

The process of the invention may also be carried out via a continuous method, by continuously introducing into the reaction zone perfluoropropylene, oxygen and the initiator, unless the latter is prepared in situ, and continuously removing from the reaction zone the products obtained.

The temperature limits within which the reaction will take place are very wide. The lower limit is determined by the fact that the reaction must occur in the gaseous phase, and it is therefore necessary not to operate below the dew point of perfluoropropylene. Temperatures down to —50° C. can usually be employed. However, it should be noted that the overall reaction is highly exothermic and that such low reaction temperatures can be maintained only by making suitable arrangements. The highest temperatures at which the process of the invention can be carried out are of the order of 350° C. The preferred reaction temperatures are from about —30° to +300° C.

The pressure range for the process of the invention is also wide. Thus, it is possible to operate under very low pressures e.g., 50 mm. Hg, or under pressures of the order of 10 atmospheres. Such high pressures however are not particularly desirable, and the preferred pressure range is from about 0.1 to 2 atmospheres.

The usefulness of the products obtained according to the process of this invention is described in the aforementioned patent applications, the contents of which are incorporated by reference herein.

Thus, products of the class of the general Formula B

are particularly stable under prolonged exposure to high temperatures. By reaction with water and aqueous bases they can be easily transformed into free acids and into salts, respectively.

The free acids and their alkali or ammonium salts show a considerable surface activity, which increases with the chain length, and which, within given limits of this length, can reach extremely high values.

The products belonging to this class [Formula B], can be used as surface-active agents having high thermal and chemical stability.

These surface-active agents can be usefully employed in all the fields indicated by the modern technique for these products, and more particularly, for electro-chemical deposition processes, for polymerization process, for the treatment of fabrics, and as additions for lubricants.

Derivatives of the acids then will impart desired properties of water- and oil-repellency to fibres, fabrics or pelts.

Other derivatives of these products, such as, e.g., esters, nitriles, etc., find application as solvents, reaction media, heat-transmission media, etc.

The different chemical reactivity of the compounds of the general Formula A, $CF_3$—O—$(CF_2O)_n$—COF, indicates other fields of application for them.

These compounds, through reaction with organic or inorganic bases, with alcohols, etc., give the same reaction products that would be obtained by the reaction of $COF_2$. These compounds may therefore be useful as intermediates for various syntheses, e.g., of organic carbonates, substituted ureas, etc., when it is desired not to use dangerously toxic gases such as phosgene or carbonyl fluoride. Other useful applications of these compounds derive from the possibility of transforming, through suitable reactions, the terminal group —OCOF into a group having a higher stability. This results in imparting a marked thermal and chemical stability to the whole polyether chain.

The following examples will further illustrate the invention.

The identification of the products obtained is confirmed by the results of elemental analysis, determinations of the molecular weights, and in particular by the I.R. and N.M.R. spectra and shows the identity of these products with those already described in the aforementioned patent applications.

EXAMPLE 1

Into a reactor of glass tube forming a spiral, having an inner diameter of 12 mm., and a total volume of 400 cc., externally cooled with water at 20° C., there were simultaneously introduced molecular oxygen containing 1.2% mols of ozone, at a rate of 30 l./h., and $C_3F_6$ at a rate of 12 l./h., so that the total pressure was 1 atmosphere. The products leaving the reactor were continuously collected in collectors cooled to —78° C. and at the temperature of liquid nitrogen.

The products thus obtained from the reaction were separated by fractional distillation and by preparative chromatography. The $C_3F_6$ was 89.5% converted. The following products were found to be present. Their percentage by weight of the total of the reaction products is also reported:

carbonyl fluoride, $COF_2$ (boiling temperature —78° C.), 34.9% trifluoroacetyl fluoride, $CF_3COF$ (boiling temperature —58° C.), 31.5% trifluoromethylfluoroformate, $CF_3OCOF$ (boiling temperature —34° C.), 12.6%

2-oxa-pentafluoropropyl fluoroformate, $CF_3OCF_2OCOF$ (boiling temperature +7° C.), 2.9%

3-oxa-pentafluorobutanoyl fluoride, $CF_3OCF_2COF$ (boiling temperature —9.7° C.), 4.4%

3,5-dioxa-heptafluoro-hexanoyl-fluoride, $$CF_3OCF_2OCF_2COF$$

(boiling temperature +30° C.), 1.5%
2,4-dioxa-heptafluoro-pentylfluoroformate, $$CF_3O(CF_2O)_2COF$$

(boiling temperature 45° C.), 1.3%
3,5,7-trioxa-nonafluoro-octanoylfluoride, $$CF_3O(CF_2O)_2CF_2COF$$

boiling temperature 13° C./250 torr), 1.0%
2,4,6-trioxa-nonafluoro-heptylfluoroformate, $$CF_3O(CF_2O)_3COF$$

(boiling temperature 27–29° C./250 torr), 1.0%
3,5,7,9-tetraoxa-undecafluoro-decanoylfluoride, $$CF_3O(CF_2O)_3CF_2COF$$

boiling temperature 35° C./150 torr), 0.8%
2,4,6,8-tetraoxa-undecafluorononylfluoroformate, $$CF_3O(CF_2O)_4COF$$

(boiling temperature 47–49° C./150 torr), 0.8%
3,5,7,9,11-pentaoxa-tridecafluoro-dodecanoyl fluoride, $$CF_3O(CF_2O)_4CF_2COF$$

(boiling temperature 55° C./150 torr), 0.5% and additionally 6.8% by weight of a mixture of products of higher molecular weight, having a composition analogous to that of the aforelisted products and having an average composition: C=18.4%; F=57.5%; O=24.1% and an average molecular weight of about $10^3$.

EXAMPLE 2

Into the reactor of Example 1 and using the same procedure, there was introduced molecular oxygen having an ozone content of 5.3%, at a flow-rate of 10 l./h. and $C_3F_7$ at a flow-rate of 5.1 l./h., under a total pressure of 750 mm. Hg.

95% of the $C_3F_7$ was converted, the products obtained and their distribution being analogous to those of Example 1.

EXAMPLE 3

In this experiment a cylindrical glass reactor was used having a diameter of 15 cm. and an inner volume of 1950 cc., provided with a mercury manometer and cocks for the introduction of gas, and containing a double walled quartz well, the space between the two walls being evacuated. In the well a U.V. lamp (Hanau NK 6/20) cooled by circulation of flowing water, was placed.

Into the reactor, maintained at a temperature of —30° C. by means of a cryostat, gaseous $C_3F_6$ was introduced up to a pressure of 360 mm., followed by $O_2$ up to a total pressure of 715 mm. Hg.

The lamp was switched on and a progressive pressure decrease was observed. Within 8 hours the pressure reached a constant value of 491 mm. Hg. At the end of the reaction, the composition of the mixture obtained was as follows:

| | Percent by weight |
|---|---|
| Oxygen | Trace |
| Carbonyl fluoride | 17.7 |
| Trifluoroacetyl fluoride | 18.2 |
| Perfluoropropylene | 17.7 |
| Trifluoromethylfluoroformate | 8.4 |
| 3-oxa-pentafluorobutanoylfluoride | 0.8 |
| 2-oxa-pentafluoro-propylfluoroformate | 7.2 |
| 3,5-dioxa-heptafluorohexanoylfluoride | 0.3 |
| 2,4-dioxa-heptafluoropentylfluoroformate | 0.6 |

Additionally, 29.1% of a liquid was obtained. This liquid consisted of the higher homologues of the same series, and had an average composition corresponding to the empirical formula $C_1F_{1.95}O_{0.90}$ and an average molecular weight of about 2000.

EXAMPLE 4

Into the reactor of Example 3, maintained at a temperature of 25° C. (after having applied vacuum), there was introduced a $C_3F_6/O_2$ mixture containing 36% by mols of $C_3F_6$ until a total pressure of 105 mm. Hg had been reached.

The U.V. lamp was switched on and after some minutes the reaction commenced, with a decrease of the total number of mols.

The pressure dropped to 77 mm. Hg within 3 hours. At this time the conversion of $C_3F_6$ into the reaction products was quantitative.

The products obtained were the same as described in Example 3 and their percentages were substantially the same.

EXAMPLE 5

Into a glass flask having a volume of 3 liters, provided with cocks and manometers, and previously evacuated, there was introduced a 1:1 molar mixture of $C_3F_6$ and $O_2$ to reach a total pressure of 760 mm. Hg.

By means of a $Co^{60}$ source, the gaseous mixture was irradiated with $\gamma$ radiations, with a dose intensity of $2.95 \times 10^5$ rad./h., for 25 hours at room temperature.

Thereafter, the products were examined.

It was found that the perfluoropropylene had been 90.26% converted. The following products were obtained (percentage by weight of the total reaction products is reported):

| | Percent |
|---|---|
| Carbonyl fluoride | 20.6 |
| Trifluoroacetylfluoride | 30.5 |
| Trifluoromethylfluoroformate | 12.3 |
| 3-oxapentafluorobutanoyl fluoride | 2.1 |
| 2-oxa-pentafluoropropylfluoroformate | 14.0 |
| 3,5-dioxa-heptafluorohexanoylfluoride | 0.2 |
| 2,4-dioxa-heptafluoropentylfluoroformate | 3.1 |

Additionally, there was obtained 17.2% of liquid products, which were higher homologues of the same series.

EXAMPLE 6

For this experiment a spherical glass reactor was used, having a capacity of 4.750 litres, provided with thermometer, mercury manometer, gas inlet tubes and gas and liquid outlet tubes, and having in the center a quartz well containing a U.V. lamp of the Hanaw Q81 type, cooled with water.

The U.V. lamp was switched on and into the reactor there was introduced a gaseous mixture of $C_3F_6$ (42% by mols) and $O_2$ (58% by mols) under atmospheric pressure and with a constant flow-rate of the mixture of 30.9 l./h. The temperature of the reaction mixture raised spontaneously to 120° C.

The liquid and gaseous products leaving the reactor were collected in traps cooled with solid $CO_2$/acetone and with liquid nitrogen. The reaction was carried on for 120 minutes. At the end of the reaction the products obtained were analyzed. It was found that the conversion of $C_3F_6$ into the reaction products was 90.5%. The reaction products were as follows:

| | Percent by weight |
|---|---|
| Carbonyl fluoride | 23.3 |
| Trifluoroacetylfluoride | 24.7 |
| Trifluoromethylfluoroformate | 14.8 |
| 3-oxa-pentafluorobutanoylfluoride | 4.5 |
| 2-oxa-pentafluoro-propylfluoroformate | 10.5 |
| 3,5-dioxa-heptafluorohexanoylfluoride | 0.9 |
| 2,4-dioxa-heptafluoropentylfluoroformate | 4.5 |

Additionally, there was obtained 16.8% by weight of liquid products of higher molecular weight, consisting of members of the two series of compounds having the formulae $CF_3O-(CF_2O)_nCOF$ and $$CF_3O-(CF_2O)_nCF_2COF$$

This mixture of liquids had an average molecular weight of about 1800.

EXAMPLE 7

Into a reactor consisting of a glass tube having an inner diameter of 12 mm., a total volume of 50 cc., there were introduced, contemporaneously through two nozzles, perfluoropropylene with a flow-rate of 12 l./h., and molecular oxygen containing 1.2% by mols of ozone with a flow-rate of 30 l./h., so as to obtain a total pressure of 1 atmosphere. In the zone of contact of the two gases an autogenous temperature of 300° C. was reached. On leaving the reaction zone the gases were cooled by sprinkling water on the outer wall of the reactor. The products leaving the reactor were collected successively in traps cooled in solid $CO_2$-acetone and in liquid nitrogen. The products thus obtained were subjected to analysis.

The perfluoropropylene conversion was 83.2%. The reaction products were as follows (in percentage by weight of the total reaction products):

| | Percent |
|---|---|
| Carbonyl fluoride | 36.9 |
| Trifluoroacetyl fluoride | 33.5 |
| Trifluoromethylfluoroformate | 10.6 |
| 3-oxa-pentafluorobutanoyl fluoride | 4.4 |
| 2-oxa-pentafluoropropylfluoroformate | 2.0 |
| 3,5-dioxa-heptafluorobutanoylfluoride | 1.6 |
| 2,4-dioxa-heptafluoropentylfluoroformate | 1.0 |
| 3,5,7-trioxa-enneafluorooctanoylfluoride | 1.0 |

Additionally, there was obtained 9.0% of a mixture of products of higher molecular weight, belonging to the classes of the general formulae $CF_3O(CF_2O)_nCOF$ and $$CF_3O(CF_2O)_nCF_2COF$$

EXAMPLE 8

In this experiment a spherical glass reactor (750 cc.) provided with mercury manometer, cock and transparent quartz well containing a U.V. lamp of the Pen-Ray type (power emitted 0.9 w.) were used. The reactor was kept at a temperature of about 20° C. by external circulation of water. A vacuum was applied to the reactor and perfluoropropylene was introduced up to a pressure of 760 mm. Hg and then $O_2$ up to a total pressure of 1520 mm. Hg.

The U.V. lamp was turned on and after some minutes the reaction commenced, as shown by a pressure decrease. During a period of 4 hours the pressure decreased progressively to 1040 mm. Hg.

The reaction products were collected and analyzed. The conversion of $C_3F_6$ was 79.5%. The following compounds were present (percentage by weight of the total reaction product):

| | Percent |
|---|---|
| Carbonyl fluoride | 24.0 |
| Trifluoroacetyl fluoride | 32.8 |
| Trifluoro-methylfluoroformate | 12.5 |
| 3-oxa-pentafluorobutanoyl fluoride | 1.2 |
| 2-oxa-pentafluoropropylfluoroformate | 8.7 |
| 3,5-dioxa-heptafluoro-hexanoylfluoride | 0.3 |
| 2,4-dioxa-heptafluoropentylfluoroformate | 5.5 |

Additionally, there was obtained 15.0% of liquid products of higher molecular weight, belonging to the series having the general formulae $CF_3O(CF_2O)_nCOF$ and $$CF_3O(CF_2O)_nCF_2COF$$

Variations can of course be made without departing from the spirit and scope of this invention.

Having thus described our invention, what we desire to secure by Letters Patent and hereby claim is:

1. A process for preparing polyoxyperfluoromethylenic compounds of the general formula $$CF_3-O-(CF_2O)_n-COF$$

and $CF_3-O-(CF_2O)_n-CF_2-COF$ in which $n$ is zero or a whole number from 1 to 100, comprising reacting in the gaseous phase perfluoropropylene and molecular oxygen in molar ratios of from about 2:1 to 1:10 under a total pressure of from about 0.05 to 10 atmospheres at a temperature of from about $-50°$ C. to $+350°$ C. in the presence of ozone.

2. The process of claim 1 wherein the molar ratio between the perfluoropropylene and molecular oxygen is from about 1:1 to 1:3, the pressure is from about 0.1 to 2 atmospheres, and the temperature is from about $-30$ to $+300°$ C.

3. The process of claim 1 wherein the ozone is prepared in situ by irradiation of the reaction system with electromagnetic radiations having a wavelength lower than 3300 A.

4. The process of claim 3 wherein the electromagnetic radiations are X-radiations, γ radiations, or ultraviolet radiations.

5. The process of claim 1 wherein the ozone is introduced externally in an amount of from about 0.01 to 10 mols per 100 mols of oxygen.

6. The process of claim 5 wherein the amount of ozone is from about 0.1 to 5 mols per 100 mols of oxygen.

References Cited

UNITED STATES PATENTS 3,392,097  7/1968  Gozzo et al. _____ 204—159.22

HOWARD S. WILLIAMS, *Primary Examiner.*

U.S. Cl. X.R.

260—544